United States Patent Office 3,307,116
Patented Feb. 28, 1967

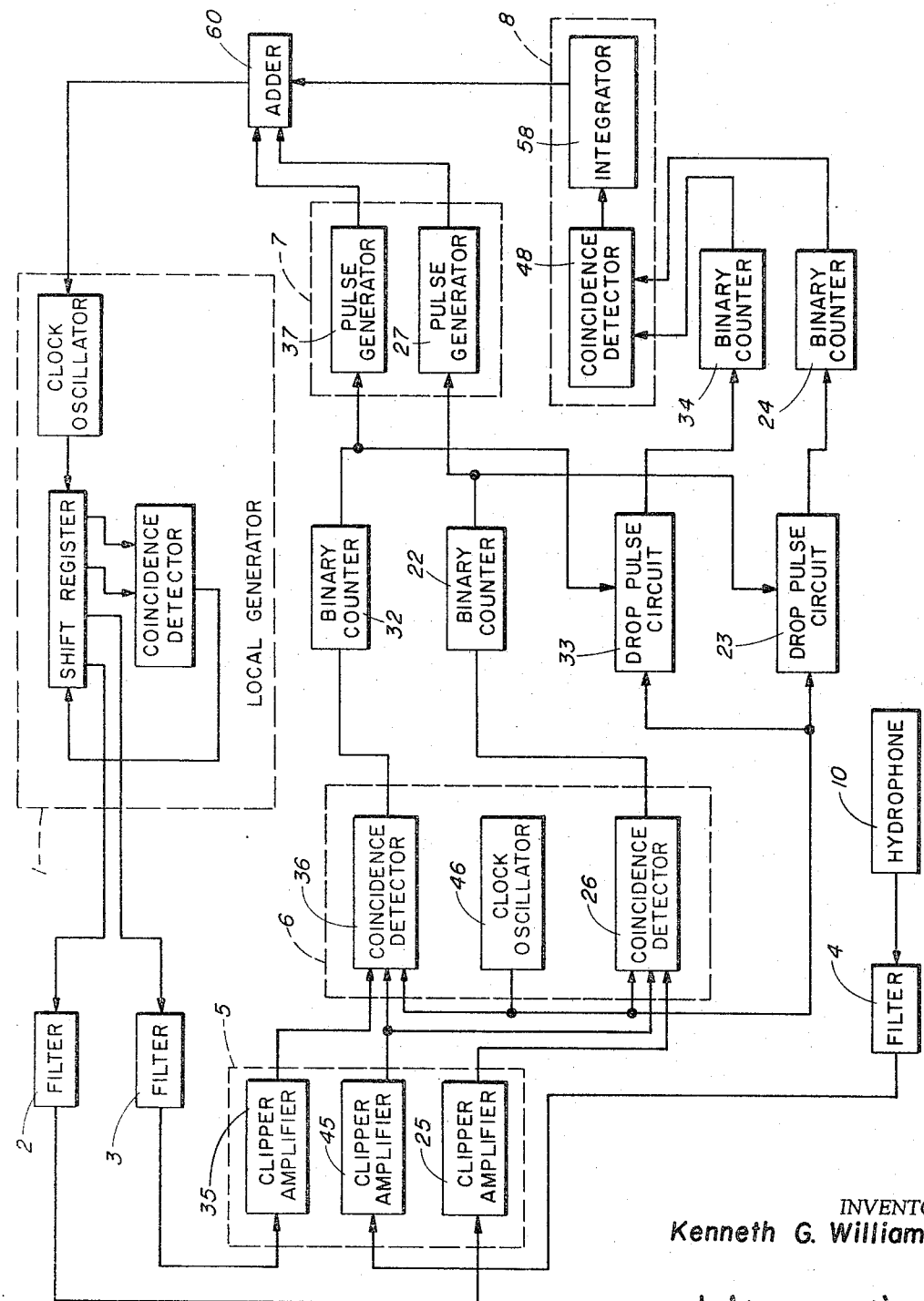

3,307,116
AUTOMATIC DIGITAL LOCK-IN SYSTEM OF WIDE-BAND SIGNALS
Kenneth G. Williams, Silver Spring, Md., assignor to the United States of America as represented by the Secretary of the Navy
Filed Nov. 26, 1965, Ser. No. 510,452
6 Claims. (Cl. 331—12)

The invention described herein may be manufactured and used by or for the Government of the United States of America for governmental purposes without the payment of any royalties thereon or therefor.

The present invention relates to a closed-loop lock-in control system and more particularly to an automatic digital lock-in system for synchronizing a wide-band signal generator with a remotely generated signal having a low signal-to-noise ratio.

In the field of servo-control systems, it has been the general practice to utilize complex analog type frequency and phase comparators for performing desired control functions on a local generating unit. Although such control circuitry has served the purpose, considerable difficulty has been experienced in accurately comparing the analog lock-in signal to the locally generated analog signal for providing a control signal to effect synchronization. Difficulties generally arise due to the incoming lock-in signal being submerged in noise with a resultant low signal-to-noise ratio, whereby extraction or detection of the true signal is not realized with the desired accuracy. A further problem exemplified by the prior art is the failure to provide a high precision control circuit, as required in precision servo-applications, which would function effectively with the desired accuracy while still providing for the stringent requirements placed on the power supply and control components.

The general purpose of this invention is to provide a servo-control digital lock-in system which embraces all the advantages of similarly employed prior art devices without possessing any of the aforedescribed disadvantages. To attain this, the present invention contemplates a unique digital lock-in system for synchronizing a wide-band signal generator with an incoming remote signal having a low signal-to-noise ratio. A pair of time displaced complex reference signals of the same bandwidth and the input information signal which is also of the same bandwidth as the complex reference signals are converted to digital form and applied to a digital correlation network. The complex reference signals and the input information signal are hereinafter referred to as reference signals and input information signal, respectively. The digital correlation between the input signal and each of the reference signals is determined and stored for a period of time to obtain the average trend and then the resultant average of the stored signals is correlated and converted to a control voltage for controlling the frequency of the original reference signal.

An object of the present invention is the provision of an all electronic control circuit which may be readily employed to control one system to obtain synchronization with another.

Another object is to provide a control circuit utilizing a comparator capable of evaluating an input signal with a high noise content against time advanced and time delayed reference signals and providing an accurate indication as to whether or not the input signal lies between the reference signals.

A further object of the invention is the provision of a servo-control apparatus for detecting a weak signal in the presence of high noise over a wide frequency range which is more accurate in operation, simpler and less costly in construction, and highly dependable using readily available electronic components.

Still another object is to provide a frequency control system which accomplishes the above objectives and which involves less power consumption and less power dissipation than devices presently available for performing the same or similar functions.

A still further object is to achieve the foregoing objects with reliable operating apparatus yielding accurate output indications.

Other objects, advantages and novel features of the invention will become apparent to those skilled in the art as the disclosure is made in the following description of a preferred embodiment of the invention as illustrated in the accompanying sheet of drawing.

Referring now to the drawing, there is shown a local wide-band variable frequency generator 1 which produces a pair of time displaced reference signals of the same frequency for comparison with an incoming remote signal from the input means shown as hydrophone 10. The two input reference signals from local generator 1 and the incoming remote signal from the hydrophone 10 are applied through filtering networks 2, 3 and 4, respectively, to clipper amplifiers 25, 35 and 45, respectively, which function in the capacity of an analog to digital converter shown as block 5. The information content of the digital signals, which are in binary form, is represented only by the axis-crossings as a function of time.

Two complete correlators are employed in the present digital lock-in system. A complete single correlator is composed of two clipper amplifiers, a coincidence detector, a binary counter, and a clock oscillator. In this system, clipper amplifier 45 and the clock oscillator 46 are common to both correlators.

The reference signals applied to clipper amplifiers 25 and 35 are identical pseudo-random signals with an infinite signal-to-noise ratio. One of these signals is delayed a nominal amount with respect to the signal portion of the incoming remote signal, while the other signal is advanced the same nominal amount relative to the remote signal. The values of the correlation function generated by the two coincidence detectors will be identical: (1) if the correlation function is symmetrical about zero delay, and (2) if the advance and delay times are the same. The derivatives of the correlation function at these identical delays have opposite signs so that when the two delay periods are not quite equal, there will be a difference in the average pulse rate from the two coincidence detectors. It is this difference in rate which causes the servo system to make corrections.

The coincidence detectors 26 and 36 comprise an arrangement of logic networks which produce a sampled output of the coincidence wave form resulting from the true binary product of the two clipped signals. As an example, if the two input analog signals are incoherent, the two clipped signals will tend to be in agreement 50 percent of the time. Thus the output of the coincidence detector will produce an average of 500,000 pulses per second, assuming that clock oscillator 46 has a frequency of one megacycle per second, and they will occur at random intervals if the input signals are essentially noise. This average rate of 500,000 pulses per second corresponds to zero percent correlation. If the input signals are perfectly coherent, the output pulse rate would then be exactly one megacycle per second, corresponding to 100 percent correlation. More often, however, the average pulse rate will lie somewhere in between these extreme values depending upon the degree of correlation of the input signals.

The output of coincidence detectors 36 is fed to a binary counter 32 and the output of coincidence detector 26 is fed to binary counter 22. Binary counters 32 and 22 consist of multi-stage serial counters which require all of the stages to be filled before an output pulse is obtained. If it were a one-stage counter, an output pulse could be received on every second pulse and if it were a two-stage counter, an output pulse would be received every fourth pulse. When the counter is filled it is reset and counting is initiated once again.

The clock oscillator 46 has its output also fed to a drop pulse circuits 33 and 23. These drop pulse circuits normally pass pulses received at their input. It should be noted that binary counters 32 and 22 are connected to drop pulse circuits 33 and 23, respectively. An output from binary counter 32 or binary counter 22 would act to inhibit its respective drop pulse circuit such that the input received for the drop pulse circuit would not appear on the output circuit upon concidence of an input pulse from the binary counters.

The outputs of the drop pulse circuits 33 and 23 are fed into binary counters 34 and 24 which are multi-stage serial counters similar to binary counters 32 and 22 and operate such that when the counter is completely filled an output pulse is produced and the counter is reset to zero. It should be noted that the two binary counters, 34 and 24 effectively count all the pulses produced by the clock oscillator 46 as these pulses are normally fed through the drop pulse circuits 33 and 23. The output from binary counter 34 should then occur at the same rate as the output of binary counter 24. Likewise, the output of coincidence detector 36 is equal to the output of coincidence detector 26, then binary counters 32 and 22 each will produce output pulses at the same frequency, so that drop pulse circuit 33 and drop pulse circuit 23 will each be inhibited a like number of times. Assume that coincidence detector 36 is producing more outputs than coincidence detector 26. Binary counter 32, then, would produce more outputs and would inhibit drop pulse circuit 33 more frequently than binary counter 22 inhibits drop pulse circuit 23, such that binary counter 34 would be counting fewer pulses and producing fewer output pulses than binary counter 24.

Coincidence detector 48 operates in a similar manner as coincidence detectors 36 and 26 except for the fact that it has no oscillator input. It receives the outputs of binary counters 34 and 24 and is continually comparing the coincidence of these two pulses.

If the random signal is equally spaced between the two reference signals the output of the binary counters will have equal frequencies and some definite phase relationship. If the reference signals become displaced, the frequency of one of the binary counters will change slightly producing a phase change between the output signals of the binary counters.

The coincidence detector produces a series of rectangular pulses whose widths are determined by the phase relationship of the binary counters.

The RC integrator 58 merely averages the output signal of the coincidence detector 48 to obtain a voltage magnitude for controlling the frequency of the local generator.

The phase control circuitry 7 consists of a positive pulse generator 37 and a negative pulse generator 27. These two generators put a spike pulse out upon occurrence of an input. The input occurs each time binary counters 32 and 22 produce an output. Positive pulse generator 37 and negative pulse generator 27 function as a phase conrtol, network 7 and operate upon the theory that a small spike pulse will change the frequency instantaneously for a few cycles and will bring and maintain the oscillator frequency in phase with the input signal frequency.

The frequency control network 8 functions as a coarse control circuitry with the phase control network 7 functioning as the vernier or fine control circuitry. The outputs of the frequency control network 8 and phase control network 7 are applied to the local generator 1 through an adder 60 to lock in the frequency of the local generator to the frequency of the incoming remote signal. Thus, the invention consists in a closed loop system in which an input frequency signal is compared to a locally generated signal to determine the correlation between the two signals. The results of this correlation is stored over a relatively long period of time to obtain a statistical average and the output of this memory is then fed to a control circuit which control the frequency of the local generator.

Obviously many modifications and variations of the present invention are possible in the light of the above teachings. It is therefore to be understood, that within the scope of the appended claims, the invention may be practiced otherwise than as specifically described.

What is claimed is:
1. An automatic digital lock-in system comprising:
   an input signal means;
   a variable frequency oscillator;
   correlation means for respectively comparing a signal from said input signal means, having a low signal-to-noise ratio, with each of a pair of time displaced reference signals produced by said variable frequency oscillator;
   digital memory means responsive to the outputs of the correlation means for storing correlation data for a period of time, whereby the average trend of the correlated signals is obtained;
   frequency control means whereby the resultant average of the correlated signals is further correlated and converted to a control voltage for synchronizing the frequency of the variable frequency oscillator with the frequency of the input signal.
2. The automatic digital lock-in system in accordance with claim 1, wherein the digital memory means comprises at least a pair of binary counters, wherein the correlated data is stored for a predetermined number of cycles.
3. The automatic digital lock-in system in accordance with claim 1, wherein the correlation means comprises:
   an analog to digital converter for providing binary information signals;
   a clock means; and
   a polarity coincidence detecting means responsive to said binary information signals and signals from said clock means.
4. The automatic digital lock-in system in accordance with claim 3, wherein the polarity coincidence detecting means comprises a pair of coincidence detectors, wherein each detector is responsive to pass a clock signal upon the simultaneous occurrence of an input pulse signal and a reference pulse signal.
5. The automatic digital lock-in system in accordance with claim 3, wherein the frequency control means comprises:
   at least a pair of drop pulse circuits connected directly to the output of the clock means and to the polarity coincidence detecting means through a storage means, whereby output pulses from the storage means inhibits the signal normally passed by the drop pulse circuits;
   a third coincidence detector for detecting and comparing the incidence of inhibiting pulses occurring at the drop pulse circuits; and
   an integrating means for averaging the output of the third coincidence detector and providing a control voltage to synchronize the variable frequency oscillator with the input signal.
6. The automatic digital lock-in system in accordance with claim 5, wherein a second pair of binary counters interconnects the drop pulse circuits with the third coincidence detector for obtaining an average trend of the occurrence of inhibiting pulses applied to the drop pulse circuits.

No references cited.

ROY LAKE, *Primary Examiner.*

J. KOMINSKI, *Assistant Examiner.*